United States Patent Office 3,335,362
Patented Aug. 8, 1967

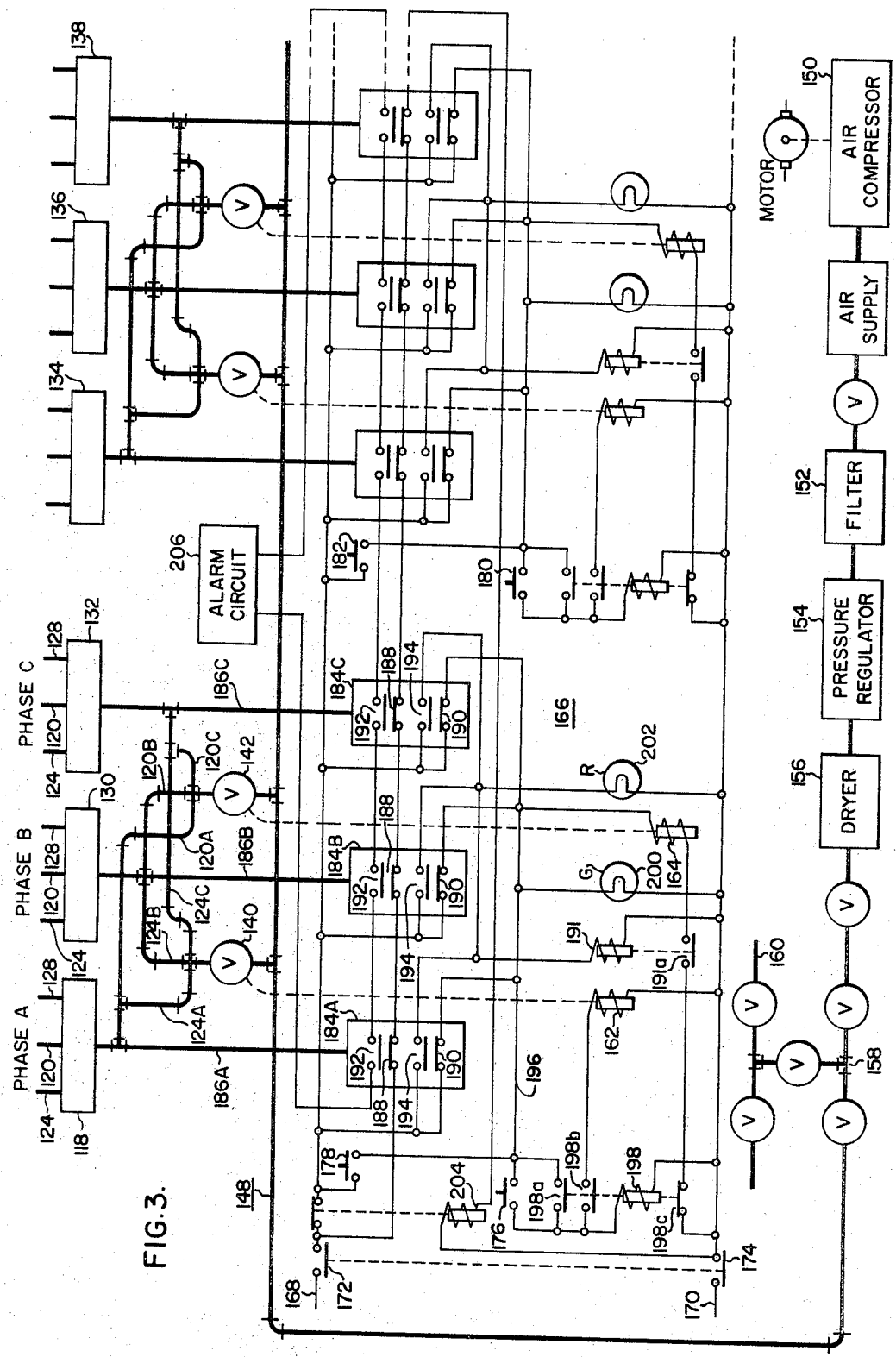

3,335,362
BYPASS SWITCH CONTROL MEANS FOR SERIES CAPACITOR INSTALLATIONS
William H. Cuttino, Bloomington, Ind., assignor to Westinghouse Electric Corporation, Pittsburgh, Pa., a corporation of Pennsylvania
Filed Oct. 12, 1964, Ser. No. 403,097
3 Claims. (Cl. 323—101)

ABSTRACT OF THE DISCLOSURE

A series capacitor installation having protective gaps and bypass switches for protecting the capacitors and an electro-pneumatic control system for the bypass switches providing remote manual operation and operation of the switches in all phases if a switch in any one phase is opened or closed.

---

Figure 1:
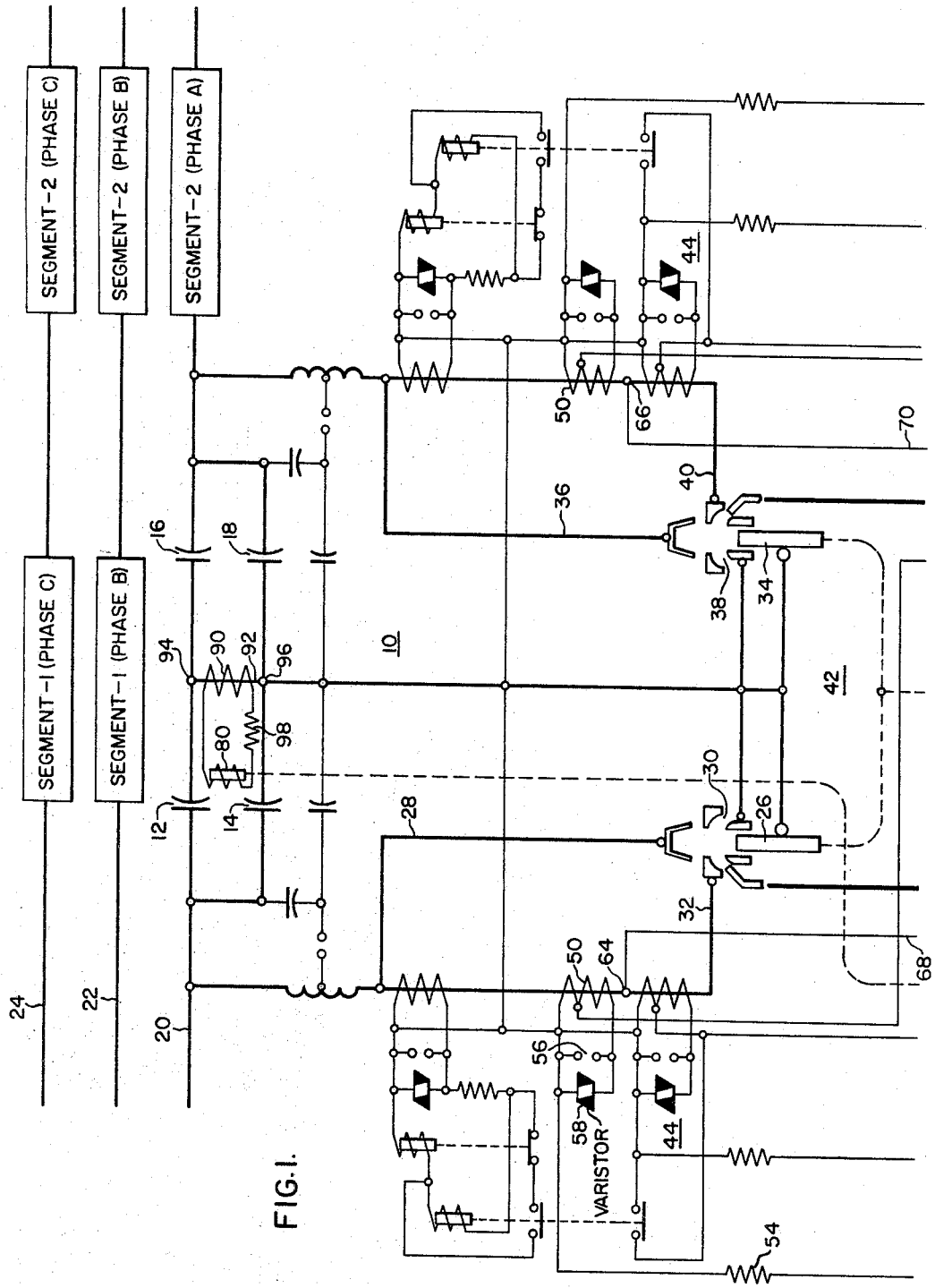

The present invention relates to switch control systems, and more particularly to control systems for pressure operated switches in multiple phase series capacitor or other installations.

In numerous multiple phase or other system applications, it is desirable that a plurality of switches or corresponding switches in the various phases be operated simultaneously in response to manually or automatically induced switch operating signals. Where the switches are connected in phase circuits to bypass phase impedance elements such as capacitors, the primary purpose for common switch operation is to maintain phase impedance balance. Other purposes can be served by the common switch operation where the switches are used for other reasons.

In the specific case of series capacitor installations, bypass switches are used in conjunction with bypass gaps for protectively bypassing the capacitors which are usually connected in a three-phase circuit. The switches bypass the capacitors under extreme fault conditions and in addition can be operated to vary, preferably with phase impedance balance, the total amount of series capacitive reactance in the transmission line served by the installation. For a fuller description of the operating theory and the utility of series capacitor installations in transmission lines and of pertaining mechanical structure and electrical circuitry, reference is made to a copending application Ser. No. 390,288, entitled "Series Capacitor Installation," filed by R. E. Marbury on Aug. 18, 1964, and assigned to the present assignee.

In accordance with the principles of the present invention, a switch control system comprises a plurality of control switching means respectively associated with all of the pressure operated installation switches in a plurality of segments or other divisions of a series capacitor or other installation. The control switching means can be located remotely from the installation switches and are manually or automatically operated to effect simultaneous pressure operation of all the installation switches in a common segment.

It is, therefore, an object of the invention to provide a novel switch control system which provides for simultaneous operation of a plurality of pressure operated switches.

A further object of the invention is to provide a novel switch control system which provides for remote operation of a plurality of pressure operated switches.

An additional object of the invention is to provide a novel switch control system which provides manual or automatic operation of a plurality of pressure operated switches.

It is an additional object of the invention to provide a novel switch control system in a series capacitor installation wherein all of the phase switches in a common segment of the installation can be closed simultaneously from a remote location.

Another object of the invention is to provide a novel switch control switch system for a series capacitor installation wherein phase impedance balance is readily achieved.

It is a further object of the invention to provide a novel switch control system for a series capacitor installation wherein maintenance access is prevented unless all the installation switches in all of the phases of all of the segments are closed.

Figure 2:
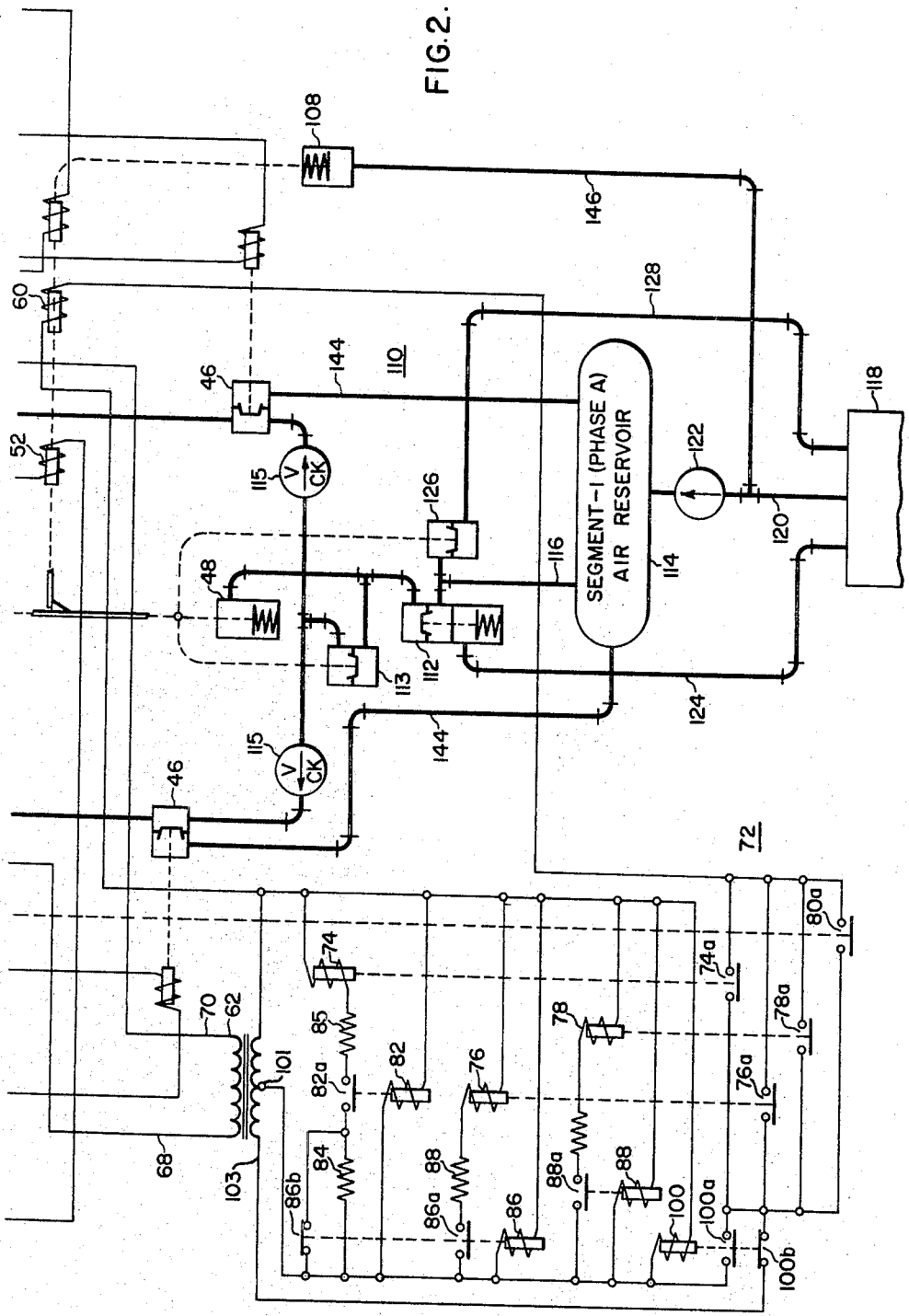

These and other objects of the invention will become more apparent upon consideration of the following detailed description along with the attached drawings, in which:

FIGURES 1-3 show schematic views of a series capacitor installation having a switch control system arranged in accordance with the principles of the invention.

More specifically, in FIG. 1, there are shown a plurality of capacitors 12, 14, 16 and 18 connected serially in a phase line 20 in one segment of a series capacitor installation 10 for a three phase transmission system. By the term "capacitor," it is meant to refer to a single capacitor unit or a plurality of capacitor units arranged in a subcombination. Additonal capacitors (not shown) are provided in each of the other phase lines 22 and 24 in the same capacitor segment as well as in all of the phase lines 20, 22 and 24 in additional capacitor segments.

The capacitors 12 and 14 are bypassed by a normally open pressure operated switch 26 in bypass path 28 and a gap 30 in bypass path 32. Similarly, the capacitors 16 and 18 are bypassed by a normally open pressure operated switch 34 in bypass path 36 and a gap 38 in bypass path 40. The switches 26 and 34 and the gaps 30 and 38 can be incorporated in a single mechanical unit as disclosed in the aforementioned Marbury patent application. The switches 26 and 34 in this case are so arranged and are thus mechanically operated as a single switch unit 42.

The bypass gaps 30 and 38 provide overvoltage protection for the capacitors 12, 14, 16 and 18 in a manner which is determined by control circuitry 44 for gas blast valve 46 (FIG. 2) as well as by other determinants. Such control is more fully treated in the Marbury application as well as in another copending application Ser. No. 400,472, filed by W. Cuttino on Sept. 30, 1964, and assigned to the present assignee, now abandoned.

The switch 42 is opened against the force of a spring (not shown) by a gas or air cylinder 48 (FIG. 2), and it is normally latched in open position until the latch (not shown) is released. Switch closing action is undertaken normally for one of two purposes: To protect the capacitors 12, 14, 16 and 18 or to vary the series reactance. In either event, it is desirable that corresponding capacitors (that is, those capacitors in the same instalaltion segment) in the phase lines 20, 22, and 24 be bypassed or reinserted simultaneously for phase impedance balancing purposes. The specific manner in which phase impedance balancing is achieved in the series capacitor installation 10 will be described hereinafter.

Various conditions in the capacitor installation 10 can be established as criteria for automatically closing the switch 42. For example, the gap 30 or 38 can be protected against continued arcing by a current transformer 50 (in the bypass path 32 or 40) which, with gap overcurrent, operates a solenoid 52 (FIG. 2) through current limiting resistor 54 to unlatch the switch 42 for closure by the charged spring. An arrester 56 and a varistor 58 protect the transformer 50 against overvoltage.

As another example, the switch 42 can be closed by means of another latch operating solenoid 60 (FIG. 2) which is energized by the secondary winding of a voltage transformer 62 when certain voltage conditions develop across the capacitors 12, 14, 16 and 18. The primary winding of the transformer 62 is connected for this purpose between circuit junctions 64 and 66 (FIG. 1) through conductors 68 and 70. The solenoid 60 is operated by transformer voltage to trip the switch 42 into a closed position when control circuit 72 is in a conductive condition to protect the capacitors against sustained overvoltage below the arcover voltage of the bypass gaps. The circuit 72 becomes conductive when relay contacts 74a, 76a, 78a or 80a is closed.

The relay contact 74a is closed if relay 82 is operated say at a capacitor overvoltage of 111% so as to close (say with greater than thirty minutes' delay) relay contact 82a which in turn energizes relay 74. Resistor 84 which is bypassed by normally closed contact 86b of relay 86 and resistor 85 limit current through the relay 74.

Similarly, the relay contact 76a is closed if relay 76 is energized (say with a thirty minute time delay) after the closing of relay contact 86a of the relay 86 which operates at say 135% capacitor overvoltage. Resistor 88 limits the current through the relay 76.

The next contact in the logic circuit is the relay contact 78a. It is closed if relay 78 is operated (say with a five minute time delay) after relay contact 88a of relay 88 is operated at say 150% capacitor overvoltage.

In addition to the capacitor overvoltage protection provided by the operation of the relay contacts 74a, 76a, 78a, the circuit 72 includes the relay contact 80a which is operated when relay 80 (FIG. 1) is operated by current transformer 90 which is connected in bridging path 92 between capacitor junctions 94 and 96. Resistor 98 limits current through the relay 80, and operation of the relay 80 is provided when current imbalance between the capacitors 12 and 14 or the capacitors 16 and 18 exceeds a predetermined value.

Relay 100 can also be connected across the output of the transformer 62 and it has a normally open contact 100a connected between the circuit 72 and transformer tap 101 and a normally closed contact 100b connected between the circuit 72 and transformer end terminal 103. Accordingly, the relay can have an operating characteristic of say 80% voltage for the purpose of changing the voltage for operating the solenoid 60 from say 120 (tap 101) to 240 volts (terminal 103) so as to operate the solenoid 60 at line load currents down to say 25%.

As a final example, the switch 42 can be closed on loss of system gas or air pressure. For this purpose, a cylinder 108 can be employed to trip the switch 42 in a manner to be discussed more fully hereinafter.

To provide simultaneous operation of corresponding segment switches 42 in the phase lines when any one or more of the switches 42 is operated automatically as described or when it is desired to close or open one or more of the switches by manual control, there is provided in accordance with the principles of the invention a central switch control system 110 (FIGS. 2 and 3) which can be located remotely from the capacitors 12, 14, 16 and 18 and the gaps 30 and 38 and the switch 42 and associated components. Thus, at the site of the installation 10, the central control system 110 can be disposed at ground level for access by operating personnel, while the balance of the series capacitor installation 10, which is normally at a relatively high voltage, is disposed on an insulating structural framework above the ground level.

The central switch control system 110 comprises gas flow circuitry and electrical control circuitry for controlling the switch opening cylinders 48 and switch closing gas actuated trip devices 108 of the various switches 42 in the capacitor installation 10. Thus, the switch opening cylinder 48 has gas (preferably air) applied thereto by means of a suitable commercially available control valve 112 which delivers air from a segment air reservoir 114 through conduit 116. The control valve 112 also delivers air to a valve 113 which, in turn, delivers air to gas blast valves 46 through check valves 115 so as to release a blast of air to the switch 42 when it is opening. The valve 113 is mechanically operated by the switch 42 to stop the flow of air to the valve 46 when the switch 42 opens.

The reservoir 114 can be physically disposed at the elevated location where the capacitors of the associated phase segment are located, and air then is delivered to the reservoir 114 from air column 118 through another conduit 120 and check valve 122. The latter valve is preferably provided to prevent reverse air flow from the reservoir 114 through the conduit 120. The construction of the air column and the general arrangement of the air column and reservoir are preferably as shown in a patent to R. E. Marbury, No. 2,597,012.

Operation of the switch control valve 112 is controlled by air pressure delivered through conduit 124 which is also connected through the air column 118. A position indicator valve 126 is mechanically operated (as indicated by dashed lines) by the switch 42 so as to deliver air pressure from conduit 116 through conduit 128 for control and other purposes when the switch 42 is opened. The trip cylinder 108, to which reference has already been made, is connected to the conduit 120 upstream from the check valve 122 so as to trip the switch 42 into a closed position on loss of system air pressure in the conduit 146.

In FIG. 3, there is shown the air column 118 for phase A of a first capacitor segment in the capacitor installation 10, and in addition there are shown air columns 130 and 132 associated respectively with phases B and C of the first capacitor segment. Further, air columns 134, 136 and 138 are also shown as being associated with phases A, B and C of a second capacitor segment in the capacitor installation 10. Additional air columns (not shown) are similarly provided for additional capacitor segments (not shown) in the capacitor installation 10.

To achieve phase impedance balancing, it is necessary that the switches 42 associated with phases A, B and C in any given capacitor segment be operated simultaneously to open or closed positions, and, since all of the capacitor segments are operated identically in this respect, only the portion of the control system 110 which is associated with the first capacitor segment will be described. Basically, a main switch control valve 140 (which can be located remotely from the switches 42) is connected through similar conduits 124A, 124B and 124C and respective conduits 124 for operating respective switch control valves 112 in the respective phases of the first segment. When air pressure is delivered by the main switch control valve 140, pressure is thus simultaneously delivered to the switch control valves 112 in the three phases of the first segment so as to open (and to air blast) the respective phase switches 42 in the first segment.

Similarly, an air reservoir feeder valve 142 (which can be located remotely from the switches 42) is connected through similar conduit lines 120A, 120B and 120C through respective conduits 120 of the three phases of the first segment and to the respectively associated phase air reservoirs 114. The air feeder valve 142 thus provides the basic air supply to the air reservoirs 114 for opening and air-blasting the switches 42 through the switch control valves 112 and the conduits 116 and for operating the air blast means for the gaps 30 and 38 through the valves 46 and conduit lines 144. When the feeder valve 142 is closed to depressurize the respective lines 120 of the segment phases, the respective air loss trip cylinders 108 are operated through respective conduits 146 in the segment phases to close the phase switches 42 in the first capacitor segment.

Air pressure is obtained from main line 148 which can be used to service the entire capacitor installation 10 or any desired number of segments of the installation 10. A motor driven air compressor 150 develops air pressure in the main line 148 through a filter 152, a pressure regulator 154 and a dryer 156. Various valves can be suitably provided as desired in the supply portion of the main pressure line 148. If desired, conduit junction 158 can be provided for air pressure delivery to one or more additional main pressure lines 160 which can respectively be associated with additional capacitor banks constructed and arranged in a manner similar to that being described for the capacitor bank serviced by the main pressure line 148.

The main switch control valve 140 is provided with an operating solenoid 162 which causes the valve 140 to deliver air pressure when it is energized. On the other hand, an operating solenoid 164 for the air feeder valve 142 causes the valve 142 to deliver air pressure when it is deenergized.

To control the operation of the solenoids 162 and 164 there is provided in the control system 110 control circuit means 166 which is energized by bus lines 168 and 170 through circuit breaker contacts 172 and 174. The bus lines 168 and 170 can be used to service as many capacitor segments as desired in the installation 10. In the portion of the control circuit means 166 associated with the first segment of capacitor segment, there is provided a bypass switch open button 176 and a bypass switch close button 178 which provide for manual operation of the phase switches 42 associated with the first capacitor segment. Similar buttons 180 and 182 can be provided in other capacitor segments of the installation 10.

Suitable commercially available pressure switches 184A, 184B and 184C are also provided in the control circuit means 166 for the purpose of producing automatic closure of the phase switches 42 under any of the predetermined conditions previously considered. Operation of the pressure switch 184A, 184B and 184C respectively is controlled by respective conduits 186A, 186B and 186C respectively connected between the three phase indicator conduits 128 and the pressure switches 184A, 184B and 184C.

Each of the pressure switches 184A or 184B or 184C is provided with two contacts 188 and 190 normally closed under conditions of no pressure delivery from the indicator conduits 128 and a pair of contacts 192 and 194 which are normally open under conditions of no pressure delivery from the indicator conduits 128. Thus, when all of the phase switches 42 are closed, all of the pressure switch contacts are in the normal positions described. On the other hand, when any of the phase switches 42 is opened, the associated pressure switch 184A or 184B or 184C is operated by means of pressure delivery through the associated indicator valve 126 and indicator conduit 128. The contacts 188 and 190 of the operated pressure switch are then opened while the contacts 192 and 194 of the operated pressure switch are closed.

A segment power supply line 196 is connected to the main bus line 168 through the manual close button 178 and, in a parallel arrangement, through the respective contacts 190 of the pressure switches 184A, 184B and 184C. The feeder valve solenoid 164 is connected between the segment power line 196 and the bus line 170 through normally closed relay contact 198c of relay 198 and contact 191a when relay 191 is energized. Thus, when the feeder valve 142 is energized by the line 196 to cut off air pressure in the air lines 120, the phase switches 42 are closed by means of the air loss trip cylinders 108. When the phase switches 42 are all open, they can be closed simultaneously by means of manual operation of the bypass switch close button 178 or by means of any of the pressure switch contacts 190 in the event one of the phase switches 42 is automatically closed by one of the aforementioned predetermined conditions. When all three switches 42 in the same segment close, the relay 191 is deenergized by the opening of contacts 194 of the pressure switches 184A, 184B and 184C. The deenergizing of the relay 191 opens its contacts 191a to deenergize the feeder valve solenoid 164 to restore air delivery to the air reservoir 114 and the trip cylinder 108.

The relay 198 is connected to the segment power supply line 196 through the bypass switch open button 176. In addition to the contact 198c, it is provided with normally open contact 198a, connected to the segment power supply line 196 in a shunt path across the open button 176, and a normally open contact 198b connected serially with the main switch valve operating solenoid 162 to the bus line 170.

Thus, if the phase switches 42 are closed manually or automatically in the manner described, they can be simultaneously reopened by closure of the switch open button 176 which energizes the relay 198 from the energized line 196 thereby opening the contact 198c to assure pressure delivery from the air feeder valve 142 to the respective phase air reservoirs 114. Contact 198a is closed and thus completes a path from the segment power supply line 196 to the solenoid 162 through the contact 198b which also closes, and the solenoid 162 thus continues to be energized even though the open button 176 is released. Upon energization of the solenoid 162, the main switch control valve 140 is operated to deliver air pressure simultaneously through the three conduits 124 thereby producing simultaneous operation of the switch valves 112 and the switch operating cylinders 48 in the respective phases of the first segment.

A green indicating lamp 200 is connected between the segment power supply line 196 and the bus line 170 to give an indication when the switches are closed. In addition, the normally open pressure switch contacts 194 are connected in parallel between the main bus line 168 and a red indicating lamp 202 which, in turn, is connected to the bus line 170. The illuminated red light gives an indication when the switches are open.

In summary of the operation of the centralized control system 110, assume that all of the phase switches 42 in the various capacitor segments are in the normally open position. Each phase capacitor in each capacitor segment is then independently provided with bypass gap protection by the gaps 30 and 38 and the bypass switches 42 are jointly closed in each capacitor segment to bypass the associated capacitors and bypass gaps by means of the voltage trip solenoid 60, any of the segment overcurrent trip solenoids 52, or by any of the segment air loss trip cylinders 108. In addition, the phase switches 42 in any given segment can be jointly closed by operation of the bypass switch close button in the associated portion of the control circuit means 166. In any event, closure of any one of the phase switches 42 in a given capacitor segment results in closure of the associated pressure switch contact 190 and energization of the power supply line 196 and the solenoid 164 in the associated portion of the control circuit means 166 to produce simultaneous closure of all of the phase switches 42 in the same capacitor segment. When the switches 42 are reopened by means of the open button 176, the pressure switch contacts 190 are opened and the power supply line 196 is deenergized to deenergize the switch opening solenoid 162.

Phase capacitor balancing and variation of line capacitive reactance are thus both conveniently and automatically achieved with the operation provided for the bypass switches 42 by the switch control system 110. Further, in a series capacitor installation as one example, the control ssytem 110 can be disposed remotely or at ground level for access by operating personnel.

When all of the capacitor segments are bypassed by the switches 42, for example for the purpose of performing maintenance, all of the pressure switch contacts 188 are then disposed in their normally closed position in a key interlock circuit to energize key interlock solenoid 204 and thereby allow access to a key for permitting personnel to close disconnect switches and isolate the capacitors and perform other functions necessary to the maintenance task. On the other hand, when all of the switches 42 are open so that all of the capacitor segments are serially connected in the transmission system, the pressure switch contacts 192 are then closed in an alarm circuit 206 which visually or otherwise indicates the open condition of the associated segment switches 42.

The foregoing description has been presented only to illustrate the principles of the invention. Accordingly, it is desired that the invention be not limited by the specific embodiment described, but, rather, that it be accorded an interpretation consistent with the scope and spirit of its broad principles.

What is claimed is:

1. In a series capacitor installation for a polyphase alternating current line having a capacitor adapted to be connected in series in each phase of the line, a protective system including a bypass switch connected across each of said capacitors, each of said switches being adapted to be actuated to open position by pneumatic pressure, individual air supply means for each switch, pneumatically actuated switch control valve means for each switch for applying pneumatic pressure from the air supply means to effect opening of the switch, means responsive to predetermined conditions of the series capacitor installation for effecting closing of each bypass switch, means responsive to loss of air pressure in each of said air supply means for effecting closing of the corresponding switch, and a control system for said switches remote from the protective system, said control system including an electrically operated main control valve for applying pneumatic pressure from a main air supply to said switch control valve means of all the bypass switches, an electrically operated air supply valve for controlling air flow from the main air supply to said individual air supply means of all the switches, means for actuating said main control valve to operate the switch control valve means to effect substantially simultaneous opening of all the bypass switches, means for actuating said air supply valve to cut off the air supply to effect substantially simultaneous closing of all the bypass switches, and means operative when the switches are open to effect actuation of the air supply valve in response to closing of any one of the switches to cause immediate closing of the remaining switches.

2. In a series capacitor installation for a polyphase alternating current line having a capacitor adapted to be connected in series in each phase of the line, a protective system including a bypass switch connected across each of said capacitors, each of said switches being adapted to be actuated to open position by pneumatic pressure, individual air supply means for each switch, pneumatically actuated switch control valve means for each switch for applying pneumatic pressure from the air supply means to effect opening of the switch, means responsive to predetermined conditions of the series capacitor installation for effecting closing of each bypass switch, means responsive to loss of air pressure in each of said air supply means for effecting closing of the corresponding switch, and a control system for said switches remote from the protective system, said control system including an electrically operated main control valve for applying pneumatic pressure from a main air supply to said switch control valve means of all the bypass switches, an electrically operated air supply valve for controlling air flow from the main air supply to said individual air supply means of all the switches, means for establishing an energizing circuit for said main control valve when any of the bypass switches are closed, manual means for completing said energizing circuit to actuate the main control valve to operate the switch control valve means to effect substantially simultnaeous opening of all the switches, means for establishing an energizing circuit for said air supply valve when any of the bypass switches are open, manual means for completing said last-mentioned energizing circuit to actuate the air supply valve to cut off the air supply to effect substantially simultaneous closing of all the switches, and means operative when the switches are open to effect actuation of the air supply valve in response to closing of any one of the switches to cause immediate closing of the remaining switches.

3. In a series capacitor installation for a polyphase alternating current line having a capacitor adapted to be connected in series in each phase of the line, a protective system including a bypass switch connected across each of said capacitors, each of said switches being adapted to be actuated to open position by pneumatic pressure, individual air supply means for each switch, pneumatically actuated switch control valve means for each switch for applying pneumatic pressure from the air supply means to effect opening of the switch, means responsive to predetermined conditions of the series capacitor installation for effecting closing of each bypass switch, means responsive to loss of air pressure in each of said air supply means for effecting closing of the corresponding switch, and a control system for said switches remote from the protective system, said control system including an electrically operated main control valve for applying pneumatic pressure from a main air supply to said switch control valve means of all the bypass switches, an electrically operated air supply valve for controlling air flow from the main air supply to said individual air supply means of all the switches, pressure switch means associated with each of said bypass switches and responsive to the position of the associated switch, each of said pressure switch means establishing an energizing circuit for said main control valve when its associated bypass switch is closed, manual means for completing the energizing circuit to actuate the main control valve to operate the switch control valve means to effect substantially simultaneous opening of all the bypass switches, each of said pressure switch means being operative to establish an energizing circuit for said air supply valve when its associated bypass switch is open, manual means for completing the last-mentioned energizing circuit to actuate the air supply valve to cut off the air supply to effect substantially simultaneous closing of all the bypass switches, and each of the pressure switch means being operative in response to closing of its associated bypass switch to directly actuate the air supply valve to cause immediate closing of the remaining switches.

References Cited

UNITED STATES PATENTS

| | | | |
|---|---|---|---|
| 2,451,939 | 10/1948 | Geiselman et al. | 323—128 X |
| 2,640,182 | 5/1953 | Cuttino et al. | 323—128 X |
| 2,949,567 | 8/1960 | Johnson | 317—12.1 |

JOHN F. COUCH, *Primary Examiner.*

A. D. PELLINEN, *Assistant Examiner.*